United States Patent
Merinova

(10) Patent No.: US 10,264,910 B2
(45) Date of Patent: Apr. 23, 2019

(54) DISPOSABLE STRAINER WITH A SQUEEZING MECHANISM

(71) Applicant: Elena Arkadyevna Merinova, Kirov (RU)

(72) Inventor: Elena Arkadyevna Merinova, Kirov (RU)

( * ) Notice: Subject to any disclaimer, the term of this patent is extended or adjusted under 35 U.S.C. 154(b) by 457 days.

(21) Appl. No.: 14/361,856

(22) PCT Filed: Nov. 30, 2012

(86) PCT No.: PCT/RU2012/000991
§ 371 (c)(1),
(2) Date: May 30, 2014

(87) PCT Pub. No.: WO2013/081500
PCT Pub. Date: Jun. 6, 2013

(65) Prior Publication Data
US 2014/0291233 A1    Oct. 2, 2014

(30) Foreign Application Priority Data

Dec. 2, 2011  (RU) ............................... 2011149134

(51) Int. Cl.
*A47J 31/08*    (2006.01)
*A47J 31/06*    (2006.01)

(52) U.S. Cl.
CPC ........... *A47J 31/08* (2013.01); *A47J 31/0636* (2013.01)

(58) Field of Classification Search
CPC ............................... A47J 31/08; A47J 31/0636

USPC ........ 99/323, 321, 495, 306, 318, 295, 299, 99/279; 210/350; 426/77–78, 80, 86, 426/115, 106, 112–113
See application file for complete search history.

(56) References Cited

U.S. PATENT DOCUMENTS

| | | | | |
|---|---|---|---|---|
| 2,881,910 A | * | 4/1959 | Murphy | B65D 85/812 206/0.5 |
| 2,885,290 A | | 5/1959 | Krasker | |
| 3,631,793 A | | 1/1972 | Bednartz | |
| 4,715,271 A | | 12/1987 | Kitagawa | |
| 4,910,811 A | * | 3/1990 | Izzi, Sr. | E03C 1/262 210/163 |

(Continued)

FOREIGN PATENT DOCUMENTS

| | | |
|---|---|---|
| CH | 534088 A | 4/1973 |
| CN | 2555746 Y | 6/2003 |

(Continued)

OTHER PUBLICATIONS

"Tea Tool", http://www.teatool.com/, ODM Group, 2009.
(Continued)

*Primary Examiner* — Ibrahime A Abraham
*Assistant Examiner* — Biniam B Asmelash

(57) ABSTRACT

A disposable strainer (1) for tea infusion comprises a base (10) and a deformable infusion container (11) with a moisture-permeable body (110) attached to the base (10). The base (10) is foldable, the disposable strainer (1) includes a squeezing mechanism (12) connected to the body (110) of the infusion container (11) and adapted to squeeze the infusion container (11) once the base (10) is folded, and the squeezing mechanism (12) consists in a first thread (121) adapted for drawing out of the disposable strainer (1).

12 Claims, 3 Drawing Sheets

(56) References Cited

U.S. PATENT DOCUMENTS

Figure 1:
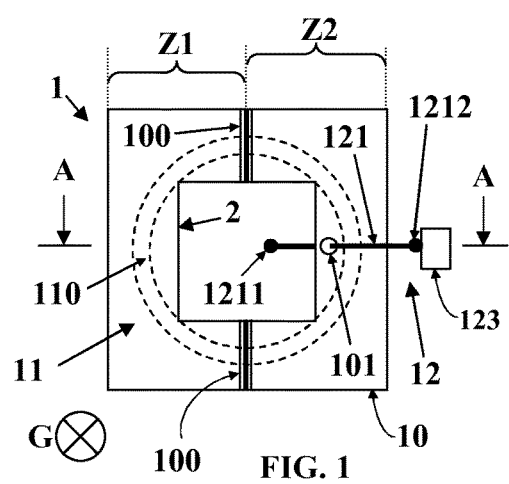

| | | | | |
|---|---|---|---|---|
| 5,366,741 A * | 11/1994 | Van Der Zon | B65D 85/808 | 206/5 |
| 5,605,710 A * | 2/1997 | Pridonoff | A47J 31/02 | 206/0.5 |
| 5,674,545 A * | 10/1997 | Shakspeare | B65D 85/812 | 426/394 |
| 5,736,042 A | 4/1998 | Aoki | | |
| 5,806,409 A | 9/1998 | Johnson et al. | | |
| 5,878,550 A | 3/1999 | Cahill et al. | | |
| 5,937,737 A | 8/1999 | Karell | | |
| 5,989,602 A * | 11/1999 | Drury | B65D 85/812 | 426/79 |
| 6,138,551 A * | 10/2000 | Bauer | A47J 31/02 | 426/82 |
| 6,844,015 B2 | 1/2005 | Yuguchi | | |
| 7,077,054 B1 | 7/2006 | Hurlock | | |
| 7,235,273 B2 * | 6/2007 | Ruston | B65D 85/808 | 206/0.5 |
| D619,428 S | 7/2010 | Saha et al. | | |
| 7,849,785 B1 | 12/2010 | Saha et al. | | |
| 2008/0213434 A1 * | 9/2008 | Burchard | B65D 85/812 | 426/82 |
| 2011/0183042 A1 | 7/2011 | Teng | | |
| 2014/0053737 A1 * | 2/2014 | Simontov | A47J 31/0636 | 99/323 |
| 2014/0199440 A1 * | 7/2014 | Merinova | A47G 19/16 | 426/80 |

FOREIGN PATENT DOCUMENTS

| | | | | |
|---|---|---|---|---|
| DE | 3935121 A1 | 4/1990 | | |
| EP | 0290801 A2 | 11/1988 | | |
| EP | 0741988 A1 | 11/1996 | | |
| EP | 1757213 A2 * | 2/2007 | | A47J 31/0636 |
| GB | 2281852 A | 3/1995 | | |
| GB | 2282059 A | 3/1995 | | |
| JP | 2005206256 A | 8/2005 | | |
| NZ | 256118 A | 11/1995 | | |
| RU | 2141438 A1 | 11/1999 | | |
| RU | 96742 U1 | 8/2010 | | |
| RU | 2446085 C1 | 3/2012 | | |
| WO | 9510461 A1 | 4/1995 | | |
| WO | 96/28365 A1 | 9/1996 | | |
| WO | WO 9903734 A1 * | 1/1999 | | B65B 29/04 |
| WO | 2012/023883 A1 | 2/2012 | | |
| WO | 2013/062448 A3 | 5/2013 | | |

OTHER PUBLICATIONS

"Dreamfarm Teafu Squeeze Tea Infuser", http://steepster.com/teas/teaware/30696-dreamfarm-teafu-squeeze-tea-infuser, Timolino Teaware, 2013.

"Kitchen: Black Silicone tea Infuser", http://www.chickenboyshop.com/servlet/the-186/souvernirs-functional-retro-pop/Detail, Chicken Boy Shop, 2014.

International Search Report for PCT/RU2012/000991, dated May 16, 2013.

\* cited by examiner

DISPOSABLE STRAINER WITH A SQUEEZING MECHANISM

The present invention mostly relates to disposable means comprising a filtering element for making drinks, namely, for infusing tea or other extracts by virtue of filtering (i.e. soaking or straining) liquid (for instance, water) through said filtering element.

One of such devices is described in the U.S. Pat. No. 3,631,793 published on Jan. 4, 1972.

In particular, according to the first of its aspects, the invention relates to a disposable strainer for infusing tea. Said disposable strainer comprises a base and a deformable infusion container with a moisture-permeable body attached to the base.

Such disposable strainer is described in the European patent application EP1757213 A2 published on Feb. 28, 2007: the applicant deems this state of the art as the closest to the claimed technical solution. This disposable strainer is represented in different versions and is realized as an individual mean for loose tea infusion. In particular, the strainer as described in EP1757213 A2 is suitable for single use (i.e. it can be used only once). It allows a consumer to make loose tea infusion of preferred quality and quantity. The drawback of the said device is that it must be submerged into a vessel with water (i.e. a glass or a cup) for tea infusion, when used as the individual mean, and must be removed from said vessel, in which case the water (more specifically, tea brew) absorbed by the infused tea will leak uncontrollably from the disposable strainer leaving unwanted tea brew stains, for example, on a table around the glass or cup, on the consumer's clothes, on the floor of the room, etc.

The present invention relies on this novel observation with the primary aim to offer a disposable strainer that serves at least to mitigate no fewer than one aforementioned drawback. For this purpose, the disposable strainer as generally described above is essentially characterised in that the base is foldable, in that the disposable strainer comprises a squeezing mechanism connected to the body of the infusion container and adapted for squeeze the infusion container once the base is folded, and in that the squeezing mechanism consists in a first thread adapted for drawing out of the disposable strainer.

The above useful features provide the consumer with a disposable device for loose tea infusion that is convenient for disposal after use as much as practical. Indeed, the squeezing mechanism makes it possible to reduce the volume of the disposable strainer after use to facilitate disposal of the same. Furthermore, a single first thread allows reducing the weight and volume of the squeezing mechanism to reduce the amount of material required to manufacture the disposable strainer and to lower transportation costs related to the delivery of the disposable strainer to the consumer (i.e. before the use of the disposable strainer) and consumer garbage removal for final disposal of the strainer once it is used by the consumer. Minimization of the squeezing mechanism volume and weight is all the more important from an environmentalist point of view, considering that the disposable strainer is a mass consumption product, so many billions of such strainers can be manufactured each year. Finally, the consumer has an opportunity to selectively squeeze the infusion drops absorbed by the tea while it was being filtered in a cup (for instance, back to the same cup containing a fresh infusion) which makes disposal of the strainer after use a more sanitary efficient procedure (a dried disposable strainer does not attract insects, it can be collected in a paper can for further disposal, etc) and, in addition, helps minimize costs of chemicals for removal of unwanted stains left on clothes, tables, floors, etc. by tea infusion drops, which, in the end, contributes to sustainable use of natural resources.

The first thread is principally laid at least partly inside the body of the infusion container. Under such conditions, the body of the infusion container is adapted to ensure freedom of movement of the first thread.

The above useful features serve to establish a more reliable connection between the squeezing mechanism and the body of the infusion container. This helps reduce the risk of first thread tearing off the body of the infusion container while the latter is being deformed as the first thread is drawn from the disposable strainer. Therefore, this feature ensures that more tea infusion gets squeezed from the tea, once the disposable strainer is used.

The base principally comprises a fold line. Under such conditions, the base is adapted for folding along the fold line.

The above useful features serve to fold the base of the disposable strainer in a controlled manner, i.e. selectively along the fold line. In this way the base can be folded so as to close the infusion container to retain the infused tea inside the infusion container. Furthermore, this helps avoid leaking of the hot infusion onto the user's fingers during the folding of the base. Subsidiarily, the fold line helps minimize the consumer's physical effort when folding the base.

The squeezing mechanism principally also comprises at least a second thread adapted for drawing out of the disposable strainer.

The above useful features serve for better squeezing of the tea from the tea infusion after the use of the disposable strainer as the squeezing pressure is then distributed across the whole body of the infusion container when the first and the second threads are drawn. Furthermore, having the first and the second threads at the same time makes the squeezing mechanism more reliable: if the first thread is damaged or has no freedom of movement due to a manufacturing fault in the strainer, the second thread serves as a backup for the first thread to ensure the expected deformation of the infusion container and, accordingly, the above degree of squeezing.

The first thread is principally laid at least partly outside the body of the infusion container.

The above useful feature makes it possible to selectively arrange individual segments of, at least, the first thread as related to the body of the infusion container. This serves to expand functional capabilities of the squeezing mechanism as it facilitates predetermined distribution of the squeezing pressure across the whole body of the infusion container. Furthermore, it allows to simplify the structure of the body of the infusion container where the first thread, at least, is not laid. This simplifies the manufacture process of the disposable strainer.

The first thread is principally laid inside the body of the infusion container, and the second thread is principally laid inside the body of the infusion container. Under such conditions, the body of the infusion container is adapted to ensure freedom of movement of the first thread and the second thread respectively.

The above useful features serve to establish a more reliable connection between the squeezing mechanism and the body of the infusion container. This helps reduce the risk of first thread and/or second thread tearing off the body of the infusion container while the latter is being deformed as the first thread and the second thread are drawn from the disposable strainer. Therefore, this feature ensures that more tea infusion gets squeezed from the tea, once the disposable strainer is used.

The body of the infusion container is principally made of several layers or several components.

The above useful features make it possible to simplify the disposable strainer manufacture process as a whole and, in particular, to simplify assembly of the body of the infusion container and laying of the first thread and/or second thread at least partly inside the body of the infusion container.

According to one of the versions of the disposable strainer, each thread from among: (a) the first thread; (b) the second thread, manifests a first end and a second end other than the first end. Under such conditions:
  the first end of the thread is fixed in the base and is immovable relative to the base, and
  the second end of the thread is movable relative to the base and is drawn during squeezing.

The above useful features allow to locate the area for fixation of the first ends of the first and the second threads respectively outside the body of the infusion container so that this area would not be exposed to the damaging effect of hot water once the infusion container is submerged in the hot water cup for infusing tea. This helps derive at least one of the following benefits:
  reduce the amount of glue required to fix the first ends of the first and the second threads respectively to make the disposable strainer manufacture process more eco-friendly,
  as the base of the disposable strainer rests against the edges of the cup, i.e. it is not submerged in water during infusion, the area for fixation of the first ends of the first and the second threads respectively does not come into contact with water and/or the fresh brew. Therefore, a non-food compatible glue can be used to fix the first ends of the first and the second threads respectively. This helps lower the weight and/or the volume of the squeezing mechanism and ultimately reduce the consumption of materials during the manufacture of disposable strainer and transportation costs.

Finally the first end of each thread, i.e. (a) of the first thread; (b) of the second thread, being immovable relative to the base, serves as a natural arrester of the respective second end of each thread, i.e. (a) of the first thread; (b) of the second thread, which is movable relative to the base and is drawn out of the disposable strainer during squeezing. For this purpose, it becomes possible to monitor the appropriate moment to stop exerting pressure for squeezing tea infusion from tea after the use of the disposable strainer. This helps retain integrity of the body of the infusion container to minimize the risk of damage to the same due to excess pressure applied by the user through oversight while drawing out each thread, i.e. (a) the first thread; (b) the second thread, for squeezing.

As an alternative, according to another version of the disposable strainer, each thread from among: (a) the first thread; (b) the second thread, manifests a first end a the second end other than the first end. Under such conditions, the first and the second ends are equally movable relative to the base.

The above useful features make it possible to minimize the length of each thread from among: (a) the first thread; (b) the second thread. This helps lower the weight and/or the volume of the squeezing mechanism and ultimately reduce the consumption of materials during the manufacture of disposable strainer and transportation costs.

The base principally comprises grooves. Under such conditions, the movable second ends of the first and the second threads respectively are adapted to pass through said grooves.

Inclusion of said grooves in the structure helps lower the weight and/or the volume of the squeezing mechanism and ultimately reduce the consumption of materials during the manufacture of disposable strainer and transportation costs. Furthermore, the grooves facilitate selective arrangement of the first and the second threads respectively for a better control of pressure uniformity while squeezing the body of the infusion container by drawing each thread from among: (a) the first thread; (b) the second thread, to squeeze the tea inside the folded disposable strainer once the tea infusion is ready.

The device (disposable strainer) can have a squeezing mechanism with a varying number of threads, for instance, it can comprise the third thread (in addition to the above-mentionned first and second threads).

The more threads there is in the squeezing mechanism, the easier it is to selectively distribute pressure when squeezing the body of the infusion container by drawing threads out of the pre-folded disposable strainer to ensure a more uniform tea squeezing. Furthermore, having a plurality of threads at the same time makes the squeezing mechanism more reliable: if one (or even more than one) thread is damaged or has no freedom of movement due to a manufacturing fault in the strainer, the remaining undamaged threads manifesting freedom of movement can ensure the expected deformation of the infusion container and, accordingly, the above degree of squeezing.

The device (disposable strainer) can have the squeezing mechanism with a varying pattern of distribution of threads.

A selective spatial arrangement of the threads of the squeezing mechanism (e.g. when the first and the second thread form a cross, i.e. intersect each other at a predetermined angle in the crosspoint) serves to facilitate distribution of pressure when squeezing the body of the infusion container by drawing threads out of the pre-folded disposable strainer to ensure a more uniform tea squeezing. Furthermore, a selective spatial arrangement of the threads of the squeezing mechanism (e.g. up imaginary spirals along the body of the infusion container with a predetermined interval for each thread along the axis shared by all imaginary spirals and passing through the center of the base at right angle to the latter) makes the squeezing mechanism more reliable: if one (or even more than one) thread of the plurality is damaged or has no freedom of movement due to a manufacturing fault in the strainer, the remaining undamaged threads manifesting freedom of movement can ensure the expected deformation of the infusion container and, accordingly, the above degree of squeezing.

The device (disposable strainer) can have holders at the movable ends of the threads of the squeezing mechanism.

The inclusion of said holders in the structure help the user to identify the threads proper and to grip the same by the fingers of a hand for further drawing out of the disposable strainer during squeezing.

The base of the disposable strainer can be manufactured from at least one of the following materials: (a) plastic; (b) cardboard; (c) any other "solid" and "easily flexible" material, having the equivalent physical parameters (as related to solidity and foldability) as plastic and/or cardboard and ensuring that the device functions as expected by the user.

The above useful feature simplifies the mass production and output of the disposable strainer while maintaining guaranteed quality.

The infusion container of the disposable strainer can be manufactured from at least one of the following materials: (a) nylon; (b) filter paper; (c) any other "easily" compressible and moisture-permeable material, having the equivalent physical parameters (as related to deformability and water-permeability) as nylon and/or filter paper and ensuring that the device functions as expected by the user.

The above useful feature simplifies the mass production and output of the disposable strainer while maintaining guaranteed quality.

The device can have a clamp on the base of the strainer adapted to fix the base of the disposable strainer in the folded position.

The above useful feature ensures that the disposable strainer can be comfortably kept in a folded position without additional exhausting efforts of the user. Therefore, the latter can concentrate on drawing at least the first thread to squeeze tea. In addition to such balanced distribution of physical effort and attention, this feature allows to prevent the user getting stressed under pressure, especially at the first encounter with the disposable strainer, and, as a result, to mitigate the risk of emergency (e.g. the infusion container body bursting during squeezing due to excess pressure applied by the user through oversight for the reason of stress) while disposing of the disposable strainer once the tea infusion is ready.

The fold line of the base can be marked by perforation, by groove, by trough, by notch, by combination of these features or by another corresponding method that ensures that the base of the disposable strainer is selectively folded so as to close the infusion container to retain the infused tea inside the infusion container.

The above useful features ensure that the base manifests selective rigidity along the fold line to facilitate folding of the base in a predetermined manner so as to close the infusion container to retain the infused tea inside the infusion container. Furthermore, the inclusion of perforation, groove (i.e. a local reduction of the base thickness along the fold line), trough, being in essence a representation of said fold line, helps lower the weight and/or the volume of the base and ultimately reduce the consumption of materials during the manufacture of disposable strainer and transportation costs.

The technical result ensured by the said battery of features is the opportunity for a consumer to easily obtain an individual portion of tea infusion from loose tea and after that to recycle the infused tea with the device in an effortless way.

According to the second of its aspects, the invention relates to the use of the disposable strainer as claimed for preparation of herbal infusions.

According to the third of its aspects, the invention relates to the use of the disposable strainer as claimed for preparation of coffee.

Figure 4:
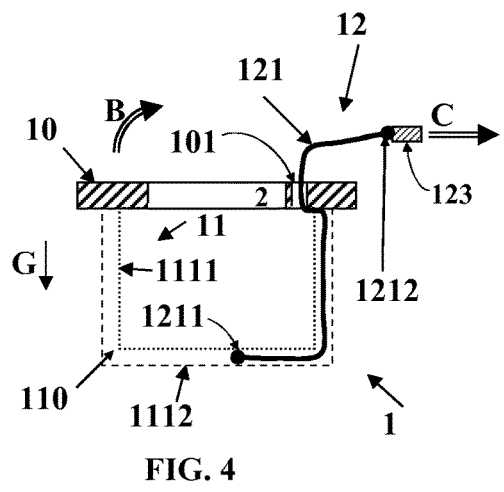
Figure 2:
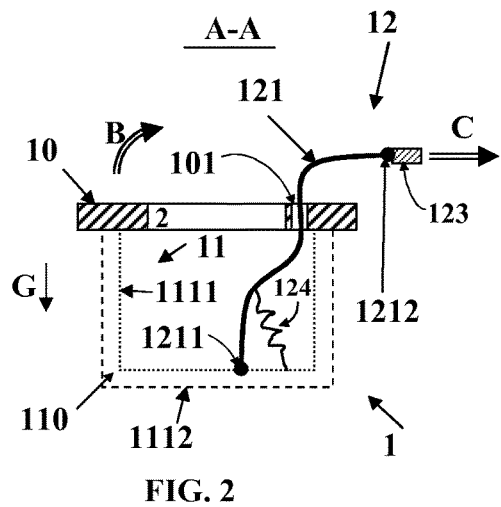
Figure 5:
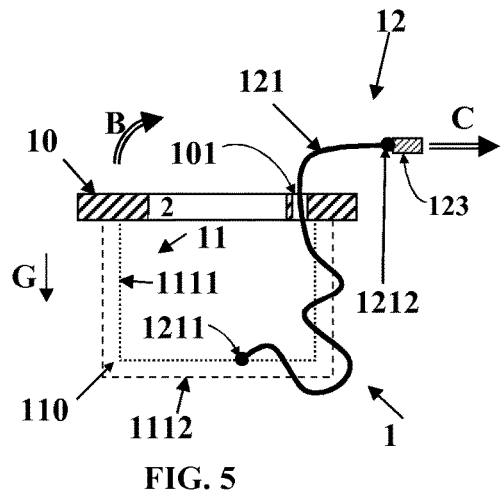
Figure 3:
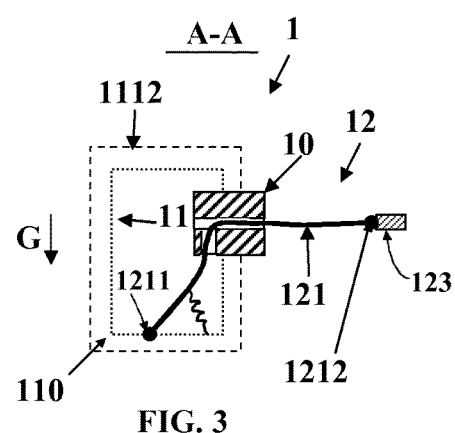
Figure 6:
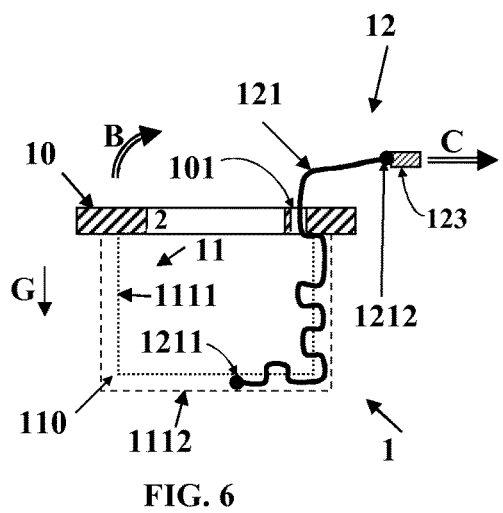
Figure 7:
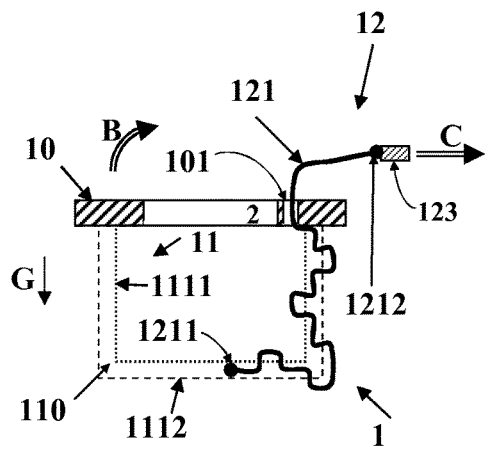
Figure 8:
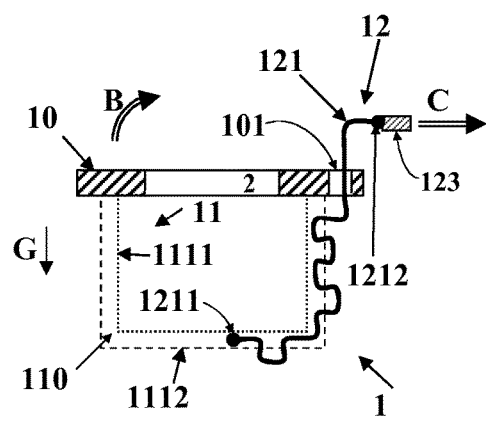
Figure 9:
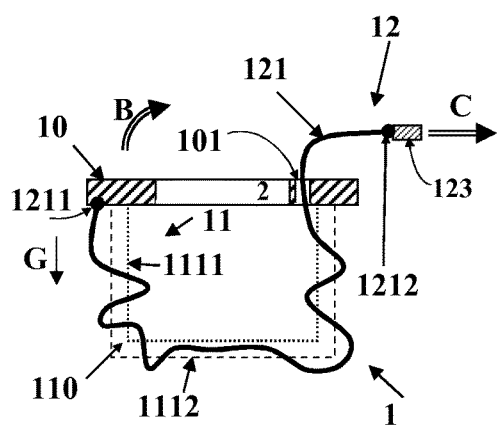
Figure 11:
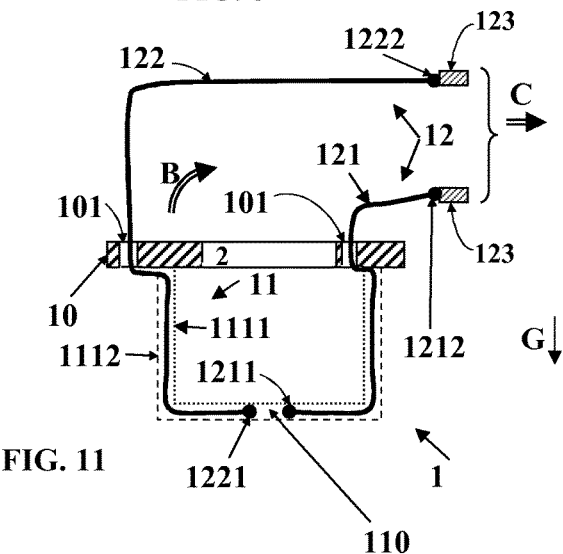
Figure 10:
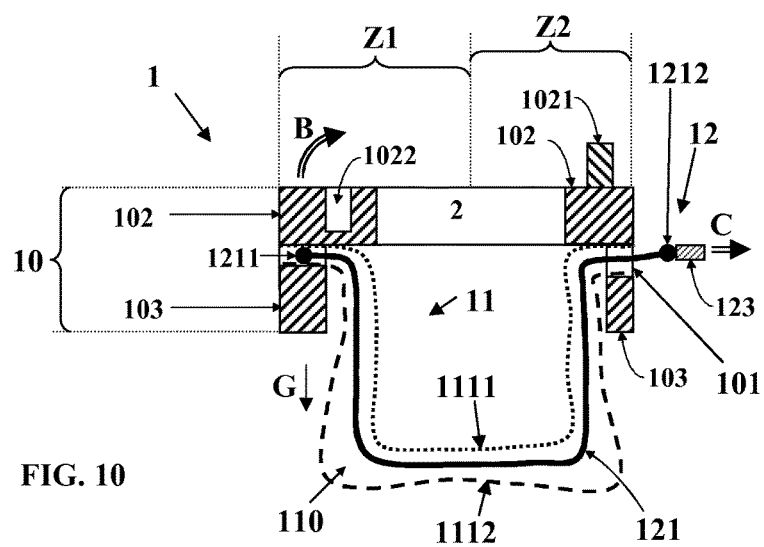
Figure 12:
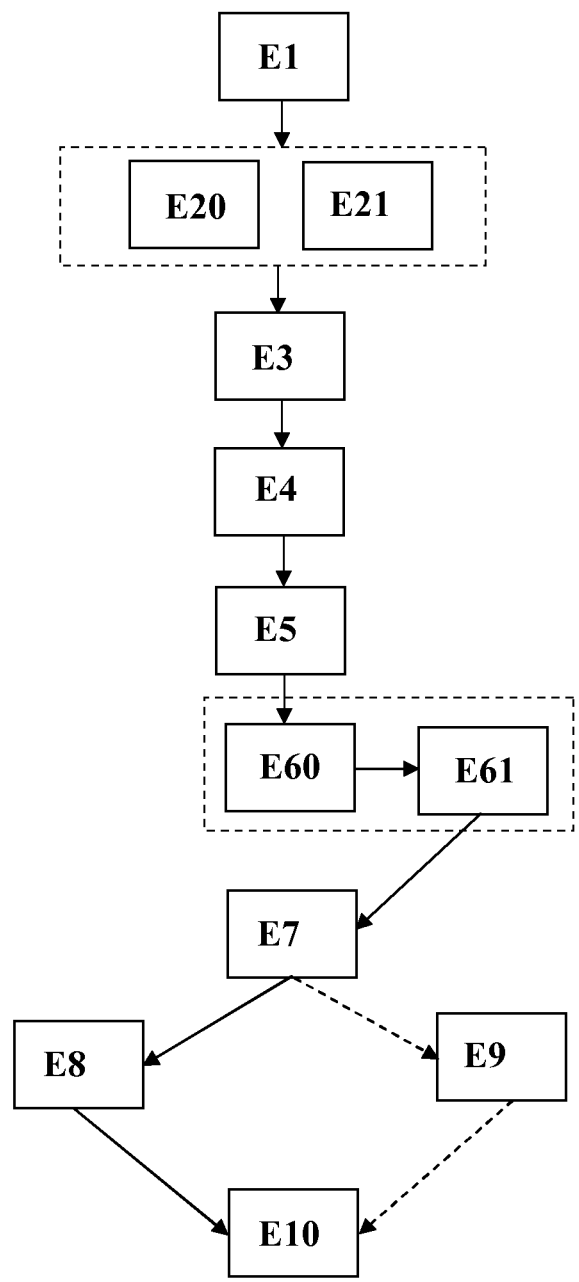

Other distinguishing features and advantages of the invention are readily apparent from the description below which includes but is not limited to the following features, with reference to the figures attached:

FIG. 1 is a layout representation of a first example of the disposable strainer according to the invention (before use) presented by a simplified plan view, FIG. 2 is a layout representation (simplified side view) of the section of the disposable strainer according to the invention, as shown in the FIG. 1 (before use): the section is shown in the AA plane passing through the geometric center of the base of the disposable strainer before use at the right angle both to said base and to the fold line of the disposable strainer, FIG. 3 is a layout representation (simplified side view) of the section of the disposable strainer according to the invention, as shown in the FIG. 1 and FIG. 2 after having been folded along the fold line (after use): the section is shown in the AA plane passing through the geometric center of the base of the disposable strainer before use at the right angle both to said base and to the fold line of the disposable strainer, FIG. 4 is a layout representation (simplified side view) of the section of the second example of the disposable strainer according to the invention (before use): the section is shown in the plane positioned at the right angle to the base and comprises the first thread, FIG. 5 is a layout representation (simplified side view) of the section of the third example of the disposable strainer according to the invention (before use): the section is shown in the plane positioned at the right angle to the base and comprises the first thread, FIG. 6 is a layout representation (simplified side view) of the section of the fourth example of the disposable strainer according to the invention (before use): the section is shown in the plane positioned at the right angle to the base and comprises the first thread, FIG. 7 is a layout representation (simplified side view) of the section of the fifth example of the disposable strainer according to the invention (before use): the section is shown in the plane positioned at the right angle to the base and comprises the first thread, FIG. 8 is a layout representation (simplified side view) of the section of the sixth example of the disposable strainer according to the invention (before use): the section is shown in the plane positioned at the right angle to the base and comprises the first thread, FIG. 9 is a layout representation (simplified side view) of the section of the seventh example of the disposable strainer according to the invention (before use): the section is shown in the plane positioned at the right angle to the base and comprises the first thread, FIG. 10 is a layout representation (simplified side view) of the section of the eighth example of the disposable strainer according to the invention (before use): the section is shown in the plane positioned at the right angle to the base and comprises the first thread, FIG. 11 is a layout representation (simplified side view) of the section of the ninth example of the disposable strainer according to the invention (before use): the section is shown in the plane positioned at the right angle to the base and comprises the first and the second threads, FIG. 12 is a layout representation with an example of a stages sequence of an operation method of the disposable strainer according to the invention.

As was mentioned before and shown in the FIGS. 1 through 12, the invention relates to a disposable strainer 1 for making drinks (e.g. for tea infusion).

The disposable strainer 1 comprises a base 10 and a deformable infusion container 11, a body 110 of which is moisture-permeable and is attached to the base 10.

As it appears from the FIGS. 1 through 11, in order to make a drink (e.g. to infuse tea), the disposable strainer 1 is aligned with the G axis which coincides with the free fall direction so that the infusion container 11 is lower than the base 10 along the G axis. Under such conditions, the base 10 is positioned on the plane which is at the right angle to the G axis and has a planar (quasi bidimensional) structure (i.e. both the width and the length of the base 10 on said plane exceed the thickness of the base 10 along the G axis (FIGS. 2 through 11). The base 10 comprises a through (in the G axis direction) hole 2. The through hole 2 is principally an internal opening, i.e. it is fully positioned inside the perimeter of the base 10 and does not go beyond the edges of the same, as shown in the plan view in the FIG. 1. By virtue of the through hole 2 in the base 10, the disposable strainer 1 and, in particular, its infusion container 11, represents an open state (to the outside) to enable the user to fill a quantity of loose tea (not shown) required for one portion of the drink through the hole 2 in the base 10 and into the open convexity formed by the infusion container 11.

According to the invention:
the base 10 is foldable,
the disposable strainer 1 comprises a squeezing mechanism 12 connected to the body 110 of the infusion container 11 and adapted for squeezing of the infusion container 11 once the base 10 is folded, and
the squeezing mechanism 12 comprises a first thread 121, adapted for drawing (along the arrow C in the FIGS. 2, 4 through 11) out of the disposable strainer 1.

The foldability of the base 10 (and the disposable strainer 1 in general) ensures (after the disposable strainer 1 is removed from the cup with the fresh drink) that the through hole 2 can be at least partly closed to retain the infused tea inside the infusion container 11 (at least partly closed). For this purpose, the base 10 is simply folded by a circular movement along the arrow B (FIG. 2) by moving at least a first edge Z1 of the base 10 toward a second edge Z2 of the base 10, said edge being opposite to the first edge Z1, away from the infusion container.

FIG. 3 demonstrates a closed state of the disposable strainer 1 (and, accordingly, the closed state of the infusion container 11) following the complete folding of the base 10, wherein the first and the second edges Z1 and Z2 of the base 10 are pressed against each other to fully close the through hole 2: i.e. the infusion container 11 becomes closed.

The squeezing mechanism 12 is principally consists in the first thread 121 adapted for drawing out of the disposable strainer 1.

The first thread 121 is principally laid (principally in a free, i.e. untensioned state) at least partly inside the body 110 of the infusion container 11 (FIGS. 5 through 9). Under such conditions, the body 110 of the infusion container 11 is adapted to ensure freedom of movement of the first thread 121.

The base 10 principally comprises a fold line 100 (FIG. 1). Under such conditions, the base 10 is adapted for folding along the fold line 100.

The squeezing mechanism 12 principally comprises at least a second thread 122 adapted for drawing (along the arrow C in the FIG. 11) out of the disposable strainer 1.

The first thread 121 is principally laid (principally in a free, i.e. untensioned state) inside the body 110 of the infusion container 11. The second thread 122 is principally laid (principally in a free, i.e. untensioned state) inside the body 110 of the infusion container 11. Under such conditions, the body 110 of the infusion container 11 is adapted to ensure freedom of movement of the first thread 121 and the second thread 122 (FIG. 11).

The body 110 of the infusion container 11 is principally composed of several layers (e.g. from two layers: a first (internal) layer 1111 facing toward the interior of the infusion container 11, and a second (external) layer 1112 facing outward relative to the infusion container 11, i.e. outside the disposable strainer 1 (FIGS. 2 through 11).

The body 110 of the infusion container 11 can also be composed of several components (not shown).

According to the first version of the disposable strainer 1, each thread from among: (a) the first thread 121; (b) the second thread 122, manifests a first end 1211, 1221 and a second end 1212, 1222 other than the first end 1211, 1221. Under such conditions, the first end 1211, 1221 is fixed in the base 10 and is immovable relative to the base 10, whereas the second end 1212, 1222 is movable relative to the base 10 and is drawn during squeezing.

The FIGS. 9 and 10 demonstrate the first version of the invention by example of the first thread 121 (the second thread lies outside the section plane in the FIGS. 9 and 10) with its first end 1211 fixed in the base 10 and immovable relative to the base 10, and its second end 1212 movable relative to the base 10 and drawn during squeezing.

According to the second version of the disposable strainer 1 (an alternative to the above-mentionned first version), each thread from among: (a) the first thread 121; (b) the second thread 122, manifests the first end 1211, 1221 and the second end 1212, 1222 other than the first end 1211, 1221. Under such conditions, the first end 1211, 1221 and the second end 1212, 1222 are movable (principally equally movable) relative to the base 10.

This second version of the structure of the disposable strainer 1 is shown in the FIG. 11, wherein the first thread 121 and the second thread 122 lie in the same section plane. As it appears from the FIG. 11:
the second end 1212 of the first thread 121 and the second end 1222 of the second thread 122 are free and, therefore, movable relative to the base 10,
the first end 1211 of the first thread 121 and the first end 1221 of the second thread 122 are connected to the body 110 of the infusion container 11 and, therefore, are movable relative to the base 10 as well, as the infusion container 11 is deformable by the squeezing mechanism 12, i.e. by drawing the first thread 121 and/or the second thread 122 out of the disposable strainer 1 (along the arrow C in the FIG. 11).

Both of the above versions of the disposable strainer 1 can have holders 123 at the movable ends of the threads of the squeezing mechanism 12: e.g. at the second end 1212 of the first thread 121 (FIGS. 1 through 11) and/or at the second end 1222 of the second thread 122 (FIG. 11).

The base 10 principally comprises grooves 101 (FIGS. 1 through 11). Under such conditions, the movable second ends 1212, 1222 of the first and the second threads 121, 122 respectively are adapted to pass through said grooves 10 (FIG. 11).

As it is shown in the FIGS. 4, 10 and 11, at least the first thread 121 can be laid completely inside the body 110 of the infusion container 11.

The above useful feature ensures that the first thread 121 cannot be damaged during manipulations with the disposable strainer 1, in particular, during the packing of the same into boxes after manufacturing before shipment to the consumer. This helps improve the quality of the disposable strainer 1 for mass manufacture.

The other advantage of said selective thread arrangement is that it does not require any additional means (for instance, positioning overlays) for keeping the first thread 121 in a selective position relative to the body 110 of the infusion container 11 for the best deformation of the same during squeezing. Elimination of such additional retention means makes the production of the disposable strainer 1 more convenient and time-efficient and reduces the weight and volume of the squeezing mechanism 12 to minimize the amount of material required to manufacture the disposable strainer 1 and to lower transportation costs related to the delivery of the disposable strainer 1 to the consumer (i.e. before the use of the disposable strainer 1) and consumer garbage removal for final disposal of the strainer 1 once it is used by the consumer.

At least the first thread 121 is principally laid partly outside the body 110 of the infusion container 11.

FIG. 6 demonstrates an example wherein the first thread 121 is laid partly inside the body 110 of the infusion container 11 and partly outside the body 110 of the infusion container 11 on the side of the first internal layer 1111 of the body 110 of the infusion container 11.

The above useful feature helps improve the quality of the disposable strainer 1 for mass manufacture. Indeed, such configuration ensures that the first thread 121 avoids damage in case of accidental contact with the second (external) layer 1112 of, for instance, the finger of an operator engaged in packing the manufactured disposable strainer 1 or the user.

The other advantage of said selective arrangement of the first thread 121 (ensured by the predetermined positioning of the points where the first thread 121 enters and exits the body 110 of the infusion container 11 on the side of the first internal layer 1111) is that it does not require any additional means (for instance, positioning overlays) for keeping the first thread 121 in a selective position relative to the body 110 of the infusion container 11 for the best deformation of the same during squeezing. Elimination of such additional retention means makes the production of the disposable strainer 1 more convenient and time-efficient and reduces the weight and volume of the squeezing mechanism 12 to minimize the amount of material required to manufacture the disposable strainer 1 and to lower transportation costs related to the delivery of the disposable strainer 1 to the consumer (i.e. before the use of the disposable strainer 1) and consumer garbage removal for final disposal of the strainer 1 once it is used by the consumer.

FIG. 8 demonstrates an example wherein the first thread 121 is laid partly inside the body 110 of the infusion container 11 and partly outside the body 110 of the infusion container 11 on the side of the second external layer 1112 of the body 110 of the infusion container 11.

The above useful feature ensures that individual segments of at least the first thread 121 can be selectively arranged relative to the body 110 of the infusion container 11. This serves to expand functional capabilities of the squeezing mechanism by facilitating predetermined pressure distribution along the body 10 of the infusion container.

Furthermore, this feature allows to simplify the structure of the body 110 of the infusion container 11 in the areas where at least the first thread 121 is not laid, to ultimately simplify the disposable strainer 1 manufacturing process.

Finally, by analogy with the example shown in the FIG. 6, yet another advantage of said selective arrangement of the first thread 121 (ensured by the predetermined positioning of the points where the first thread 121 enters and exits the body 110 of the infusion container 11 on the side of the second external layer 1112) is that it does not require any additional means (for instance, positioning overlays) for keeping the first thread 121 in a selective position relative to the body 110 of the infusion container 11 for the best deformation of the same during squeezing. Elimination of such additional retention means makes the production of the disposable strainer 1 more convenient and time-efficient and reduces the weight and volume of the squeezing mechanism 12 to minimize the amount of material required to manufacture the disposable strainer 1 and to lower transportation costs related to the delivery of the disposable strainer 1 to the consumer (i.e. before the use of the disposable strainer 1) and consumer garbage removal for final disposal of the strainer 1 once it is used by the consumer.

The examples in the FIGS. 5, 7, 9 combine the above examples from the FIGS. 6 and 8: the first thread 121 is laid partly inside the body 110 of the infusion container 11 and partly outside the body 110 of the infusion container 11 both on the side of the first internal layer 1111 of the body 110 of the infusion container 11 and on the side of the second external layer 1112 of the body 110 of the infusion container 11.

Each of the examples from the FIGS. 5, 7, 9 manifests the advantages similar to those described above in the examples from the FIGS. 6 and 8.

The base 10 principally manifests a composite structure, i.e. it comprises at least a first element 102 and a second element 103 adapted to fix the infusion container 11 to the base 10 (FIG. 10). The example in the FIG. 10 shows that the first element 102 is positioned higher than the second element 102 (relative to the G axis direction).

The above feature serves to simplify the assembly of the disposable strainer 1 in mass manufacture.

The first element 102 and the second element 103 are principally adapted to fix at least the first end 1211 of the first thread 121 to the base 10 (FIG. 10).

The above feature serves to simplify the assembly of the disposable strainer 1 with the guaranteed quality of fixation of at least the first end 1211 of the first thread 121 to the base 10.

The disposable strainer 1 can have a clamp on its base 10, said clamp adapted to fix the base 10 of the disposable strainer 1 in a closed position (with the infusion container 11 in a closed state). As it is shown in the FIG. 10, said clamp can be composed of, for instance, two parts, in particular, a pin 1021 and a notch 1022 adapted to interact, for instance, by virtue of friction. The example in the FIG. 10 demonstrates that both the pin 1021 and the notch 1022 are positioned on the first element 102 of the base 10 (on the second and the first edges Z2, Z1 of the first element 102 of the base 10 respectively).

The disposable strainer 1 can principally have a squeezing mechanism 12 with a varying pattern of distribution of threads (FIGS. 1 through 11).

The squeezing mechanism 12 principally comprises an additional means 124 (e.g. an additional overlay) of keeping at least the first thread 121 in a predetermined position (FIG. 2) relative to the body 110 of the infusion container 11.

The above useful feature ensures that at least the first thread 121 is reliably kept (especially where it lies completely outside the body 110 of the infusion container 11, as shown in the example in the FIG. 2) in the predetermined position relative to the body 110 of the infusion container 11, despite unwanted outside strains on at least the first thread 121, for instance, during packing of the disposable strainer 1 after its manufacturing into boxes for shipment to the consumer.

Several other examples (not shown) of the device (i.e. the disposable strainer) according to the invention, operation and advantages of the same are described below.

The device consists in a rigid base which is placed over the edge of a vessel with water and has a fold line going across said base, a moisture-permeable infusion container attached to said base and a squeezing mechanism of threads.

A various number of threads can also be utilized in the squeezing mechanism, and they can be arranged inside the body of the infusion container in a different manner. One end of each thread is fixed, while the other end is movable and drawn during squeezing. A version wherein the threads remain movable on both ends and end in holders, instead of being fixed in the body of the base, is also possible. The threads can be attached to the infusion section only or pass through the grooves in the body of the base.

The moisture-permeable infusion container can have several layers or be comprised of several components to fashion the same into a shape. The squeezing threads are located between the layers of the container or at the overlaps of the components. For all purposes, the container is built so as to ensure freedom of movement of the threads.

In addition, the base of the device can have a clamp which allows to fix the strainer in the folded position.

The claimed device can be produced in different volume and design. The rigid base may be of any shape and have horizontal projections to better hold onto the edges of the vessel with water or to make wide and strong enough the areas adjacent to the fold line. The infusion container can be produced in different volume and in different depths to facilitate tea infusion in various dishes.

The fold line in the rigid base may be manufactured as a groove, as a perforation line or have troughs or other corresponding features.

The device works as follows (FIG. 12). Tea is put (stage E1 in the FIG. 12) into the infusion container of the strainer, after that the rigid base of the strainer is placed (stage E20 in the FIG. 12) onto the edge of the vessel with water, and the infusion container is submerged (stage E21 in the FIG. 12) in water. Once the infusion is complete (stage E3 in the FIG. 12), the rigid base of the strainer is lifted (stage E4 in the FIG. 12) and folded (stage E5 in the FIG. 12) along the fold line to retain the infused tea inside the strainer. Then the consumer pulls (stage E60 in the FIG. 12) by the threads of the squeezing mechanism to compress the infusion container (stage E61 in the FIG. 12) with infused tea and to squeeze the excess water (stage E7 in the FIG. 12). If the base comes with the clamp, the strainer is locked (stage E8 in the FIG. 12), in the other case it can be fixed (stage E9 in the FIG. 12) in the folded position by wrapping the drawn threads around the same. The strainer is then disposed of (stage E10 in the FIG. 12).

Therefore, a version of the claimed invention is a disposable strainer for infusing tea comprising a rigid base with a fold line along which the base of the strainer is folded once infusion is complete, an easily deformable moisture-permeable infusion container and a squeezing mechanism of threads laid inside the body of the moisture-permeable container of the strainer, which allows by threads drawing to squeeze the infused tea inside the strainer once it is folded.

The device can have a moisture-permeable infusion container comprised of several layers or components.

The device can have the squeezing mechanism with a various number of threads.

The device can have the squeezing mechanism with a varying pattern of distribution of threads.

The device can have the squeezing mechanism consisting of threads, one end of each thread being fixed and immovable and the other being movable and drawn during squeezing.

The device can have the squeezing mechanism consisting of threads, both ends of each thread being equally movable.

The device can have holders at the movable ends of the threads of the squeezing mechanism.

The device can have the squeezing mechanism attached to the rigid base of the strainer, which immovable ends of the threads are fixed in a body of the rigid base, and movable ends are passed through grooves in the body of the rigid base of the strainer.

The device can be manufactured: the rigid base from a solid and easily flexible material, for example, from plastic, from cardboard or similar materials; and the infusion container from an easily compressible and moisture-permeable material, for example, nylon, filter paper and other materials ensuring an operation of the device.

The device can have a clamp on the rigid base of the strainer allowing to fix the rigid base of the strainer in the folded position.

The device can have the rigid base where the fold line is marked by perforation, by groove, by trough, by combination of these features or by another corresponding method.

Mass manufacture of the claimed disposable strainer will enable the consumer to enjoy the convenience of ready-made tea bags combined with a wide choice of loose tea varieties depending on the desired quantity and quality.

Furthermore, the said strainer is good marketing tool for loose tea manufacturers because the production of such strainer will contribute to a boost in loose tea sales, whereas low production costs of the said strainer will make it possible to bundle it with a pack of tea as an added-value bonus for the consumer.

Besides, the rigid base of the strainer may be used as an advertising vehicle.

Also, the benefits of the claimed device are minimum effort required to manufacture the said device, low costs, portability and an option to use eco-friendly materials for its production.

In view of the above, one skilled in the domain of disposable means comprising a filtering element and used for making drinks, namely, for infusing tea or other extracts by virtue of filtering (i.e. soaking or straining) liquid (for instance, water) through said filtering element, understands that:

the term "rigid base" and/or equivalent term "rigid base of a solid and easily flexible material" are clear and unequivocal definitions of the base of the disposable strainer which manifests selective physical parameters (properties) that at the same time guarantee conformity to the following limitations:

keeping the shape of the base unchanged after manufacture, in particular, in transit to the end consumer, keeping the shape of the base unchanged after the infusion container is submerged in liquid throughout the infusion process (in particular, tea infusion) by filtering (i.e. soaking or straining) liquid (for instance, water) through the body of the infusion container, keeping the shape of the base unchanged after the infusion container is removed from the liquid once the infusion is ready and before disposal of the strainer, foldability of the base, in particular, along the fold line, once the user applies pressure to said base, said pressure not exceeding the maximum force of the two finger of one hand, e.g. the thumb and the index finger of the right hand of a right-handed user, wherein said fingers move toward each other, to close the infusion container so as to retain the infused tea inside the infusion container, keeping the shape of the base unchanged, including keeping the shape of the base unchanged after it has been folded as the result of the squeezing mechanism operation, i.e. after deformation of the body of the infusion container for tea squeezing by drawing the threads of the squeezing mechanism out of the disposable strainer;

the term "easily deformable infusion container" and/or equivalent term "infusion container of an easily compressible material" are clear and unequivocal definitions of the infusion container of the disposable strainer which manifests selective physical parameters (properties) that at the same time guarantee conformity to the following limitations:

the infusion container must be capable of the first change (deformation) of its geometric shape (volume) from its original state (characteristic of the body of the infusion container before base folding) to the intermediate state (characteristic of the body of the infusion container after base folding before operation of the squeezing mechanism), keeping in mind that such first change (deformation) of the geometric shape of the infusion container takes place once the user applies pressure to said base, said pressure not exceeding the maximum force of the two finger of one hand, e.g. the thumb and the index finger of the right hand of a right-handed user, wherein said fingers move toward each other, to close the infusion container so as to retain the infused tea inside the infusion container, the infusion container must be capable of the second change (deformation) of its geometric shape (volume) from the intermediate state (characteristic of the body of the infusion container after base folding before operation of the squeezing mechanism) to the final state (characteristic of the body of the infusion container after operation of the squeezing mechanism), keeping in mind that such second change (deformation) of the geometric shape of the infusion container takes place once each thread of the squeezing is drawn (by the user's hand, gripping each thread between two fingers) out of the disposable strainer.

The invention claimed is:

1. A disposable strainer for infusing loose tea, which comprises a flat rigid base, an open top deformable infusion container with a moisture-permeable body, and a squeezing mechanism, the infusion container having an open inlet opening and a bottom, as well as a depth defined as a distance between the open inlet opening and the bottom of the infusion container, the base being configured to be horizontally placed over the edge of a vessel to cover an inlet opening of the vessel, the base having a through hole into the infusion container for filling an infusable material, an edge of an opening of the infusion container being fixed to the base around the perimeter of the through hole of the base to form a cup-shaped structure, such that the base extends perpendicular to the depth axis of the infusion container and the through hole of the base and the opening of the infusion container coincide, wherein the base consists of two portions delimited by a fold line which extends between said portions and crosses the base and the through hole of the base, wherein the base is foldable along the fold line such that the mentioned two portions are movable towards each other in a direction away from the bottom of the infusion container so as to adjoin each other, to close the through hole of the base and the opening of the infusion container, and thereby the base and the infusion container move from an unfolded state into a folded state, wherein, in the unfolded state, the through hole of the base and the opening of the infusion container are open and form together a cup-shaped structure, and, in the folded state, the base is folded along the fold line, the mentioned two portions adjoin each other and the through hole of the base and the opening of the infusion container are closed and form a single closed container, wherein the squeezing mechanism is connected to the body of the infusion container and consists of at least a first thread adapted to be partially drawn out of the disposable strainer, and the squeezing mechanism is adapted to squeeze the infusion container by drawing out the thread, at least the first thread is laid inside the body of the infusion container.

2. The disposable strainer according to claim 1, wherein the body of the infusion container is adapted to ensure freedom of movement of the first thread.

3. The disposable strainer according to claim 1, wherein the squeezing mechanism also comprises at least a second thread, adapted to be drawn out of the disposable strainer and to squeeze the infusion container.

4. The disposable strainer according to claim 3, wherein the second thread is laid inside the body of the infusion container, and wherein the body of the infusion container is adapted to ensure freedom of movement of the first thread and the second thread respectively.

5. The disposable strainer according to claim 4, wherein the body of the infusion container is composed of several layers or several components.

6. The disposable strainer according to one of claims 1-4, wherein the thread manifests a first end and a second end other than the first end, wherein the first end is fixed and is immovable, and wherein the second end is movable and is drawn during squeezing.

7. The disposable strainer according to one of claims 1-4, wherein the thread manifests a first end and a second end other than the first end, and wherein the first end and the second end are equally movable.

8. The disposable strainer according to claim 6, wherein the base comprises grooves, and wherein the movable second ends of the first and second threads respectively are adapted to pass through the grooves.

9. The disposable strainer according to claim 1, wherein the squeezing mechanism also comprises an additional means of keeping at least the first thread in a predetermined position relative to the base.

10. The disposable strainer according to claim 1, wherein the fold line crosses the center of the through hole of the base, so as to permit folding the base in half, and wherein the disposable strainer has a clamp on its base, the clamp being adapted to fix the base of the disposable strainer in a closed position with the infusion container in a closed state.

11. The disposable strainer according to claim 10, wherein the clamp comprises a pin and a notch adapted to interact by virtue of friction.

12. The disposable strainer according to claim 1, wherein an end of the thread of the squeezing mechanism comprises a holder.

* * * * *